(12) United States Patent
Bao

(10) Patent No.: US 12,309,870 B2
(45) Date of Patent: May 20, 2025

(54) WAKE UP SIGNAL PROCESSING METHOD, WAKE UP SIGNAL CONFIGURATION METHOD, AND RELATED DEVICE

(71) Applicant: VIVO MOBILE COMMUNICATION CO., LTD., Dongguan (CN)

(72) Inventor: Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 450 days.

(21) Appl. No.: 17/737,987

(22) Filed: May 5, 2022

(65) Prior Publication Data
US 2022/0264696 A1    Aug. 18, 2022

Related U.S. Application Data

(63) Continuation of application No. PCT/CN2020/137151, filed on Dec. 17, 2020.

(30) Foreign Application Priority Data

Dec. 24, 2019 (CN) .......................... 201911349121.6

(51) Int. Cl.
*H04W 52/02* (2009.01)
*H04W 76/15* (2018.01)
(Continued)

(52) U.S. Cl.
CPC ....... *H04W 76/28* (2018.02); *H04W 52/0216* (2013.01); *H04W 52/0219* (2013.01);
(Continued)

(58) Field of Classification Search
CPC ..... H04W 8/22–245; H04W 28/02–26; H04W 48/02–20; H04W 52/02–60;
(Continued)

(56) References Cited

U.S. PATENT DOCUMENTS

2019/0200296 A1    6/2019  Liu et al.
2020/0045768 A1*   2/2020  He .................. H04W 76/28
(Continued)

FOREIGN PATENT DOCUMENTS

CN          109769309 A    5/2019
CN          109923904 A    6/2019
(Continued)

OTHER PUBLICATIONS

Ericsson, "Email report [107bis#49][NR TEI16] cDRX enhancement for CA", 3GPP TSG-RAN2 Meeting #108 R2-1915292, Nov. 22, 2019 (Year: 2019).*

(Continued)

*Primary Examiner* — Timothy J Weidner
(74) *Attorney, Agent, or Firm* — IPX PLLC

(57) ABSTRACT

A Wake Up Signal (WUS) processing method, a WUS configuration method, and a terminal device are provided. The WUS processing method includes: receiving a WUS when the terminal device is configured with at least two Discontinuous Reception (DRX) groups; where the WUS is used to indicate whether to start onDuration timers in the next DRX cycles of all of the at least two DRX groups.

17 Claims, 4 Drawing Sheets

---

Configure a wake up signal WUS for a terminal device when configuring at least two discontinuous reception DRX groups for the terminal device; where the WUS is used to indicate whether to start an onDuration timer in the next DRX cycle of all of the at least two DRX groups — 501

(51) Int. Cl.
*H04W 76/28* (2018.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ..... *H04W 52/0229* (2013.01); *H04W 52/028* (2013.01); *H04W 76/15* (2018.02); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ......... H04W 72/02–569; H04W 74/002–0891; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

2021/0092681 A1* 3/2021 Nory ..................... H04W 76/28
2022/0264462 A1* 8/2022 Bao ...................... H04W 76/28
2022/0346008 A1* 10/2022 Xu ........................ H04W 76/28
2022/0346017 A1* 10/2022 Frederiksen .......... H04W 76/28

FOREIGN PATENT DOCUMENTS

CN       109952789 A       6/2019
CN       110520840 A       11/2019
WO       2019032009 A1     2/2019

OTHER PUBLICATIONS

Written Opinion of the International Searching Authority issued in corresponding International Application No. PCT/CN2020/137151, mailed Mar. 16, 2021, 4 pages (Year: 2021).*

International Search Report issued in corresponding International Application No. PCT/CN2020/137151, mailed Mar. 16, 2021, 4 pages.

Ericsson, "Email report [107bis#49][NR TEI16] cDRX enhancement for CA", 3GPP TSG-RAN2 Meeting #108 R2-1915292, Nov. 22, 2019.

First Office Action issued in related Chinese Application No. 201911349121.6, mailed Oct. 15, 2021, 9 pages.

Samsung, "Further Considerations on multiple C-DRX", 3GPP TSG-RAN\WG2 RL2, R2-1916152, Nov. 8, 2019.

Vivo et al, "WUS impact on Short DRX cycle", 3GPP TSG-RAN\WG2 RL2, R2-1912330, Oct. 4, 2019.

* cited by examiner

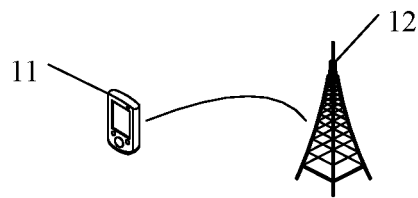
FIG. 1
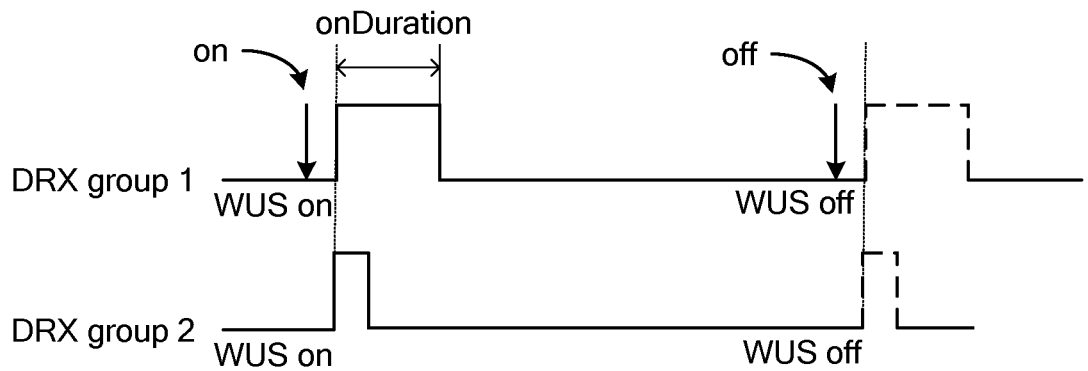
FIG. 2
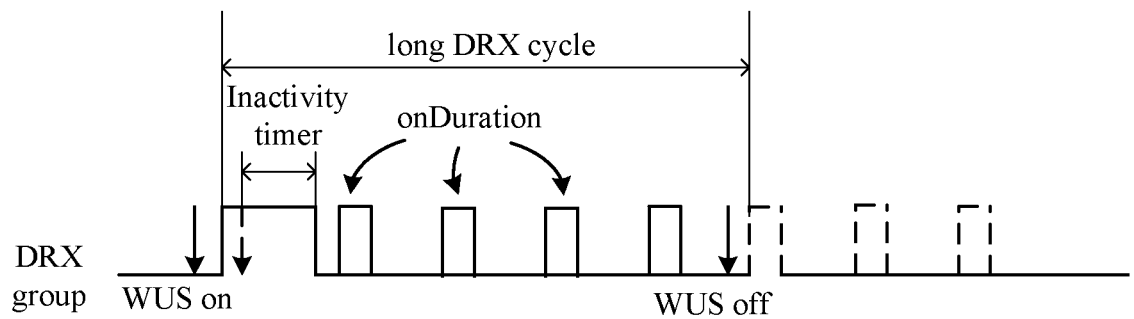
FIG. 3
FIG. 4

Configure a wake up signal WUS for a terminal device when configuring at least two discontinuous reception DRX groups for the terminal device; where the WUS is used to indicate whether to start an onDuration timer in the next DRX cycle of all of the at least two DRX groups — 501
FIG. 5
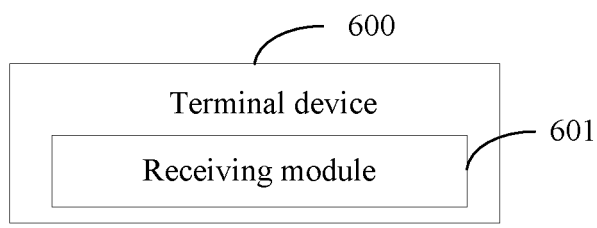
FIG. 6
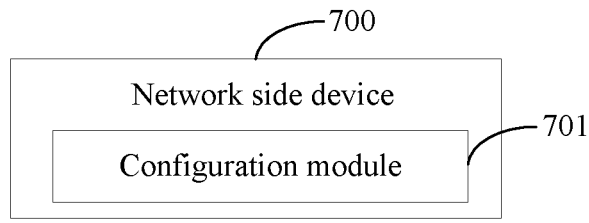
FIG. 7

WAKE UP SIGNAL PROCESSING METHOD, WAKE UP SIGNAL CONFIGURATION METHOD, AND RELATED DEVICE

CROSS-REFERENCE TO RELATED APPLICATIONS

This application is a continuation of International Application No. PCT/CN2020/137151, filed Dec. 17, 2020, which claims priority to Chinese Patent Application No. 201911349121.6 filed in China on Dec. 24, 2019. The entire contents of each of the above-referenced applications are expressly incorporated herein by reference.

TECHNICAL FIELD

The present disclosure relates to the field of communications technologies, and in particular, to a wake up signal processing method, a wake up signal configuration method, and a related device.

BACKGROUND

Discontinuous Reception (DRX) serves to save power. A terminal device in a DRX state does not need to continuously monitor a Physical Downlink Control Channel (PDCCH). A network side device can predict a service data volume of the terminal device and configure a corresponding DRX parameter for the terminal device, for example, a DRX cycle, a DRX offset, or an onDuration timer.

In an existing communications system, to further improve the power saving performance of a terminal device, a Wake Up Signal (WUS) based on a PDCCH is introduced. The WUS can also be referred to as Downlink Control Information with Cyclic Redundancy Check scrambled by a Power-Saving Radio Network Temporary Identifier (DCI with CRC scrambled by PS-RNTI, DCP). The WUS serves to inform the terminal device whether to monitor a PDCCH in onDuration of DRX, so that the terminal device can determine, according to indication of the WUS, whether to start an onDuration timer in the next DRX cycle and whether to monitor a PDCCH.

The current WUS operation method is defined based on that the terminal device has only one group of DRX configurations. However, when a terminal device is configured with multiple DRX groups, there is no related solution to how to indicate wake up or sleep for the multiple DRX groups.

SUMMARY

Embodiments of the present disclosure provide a wake up signal processing method, a wake up signal configuration method, and a related device, to provide a simple WUS indication solution when a terminal device is configured with multiple DRX groups.

To resolve the foregoing technical problem, the present disclosure is implemented as follows:

According to a first aspect, an embodiment of the present disclosure provides a wake up signal processing method, where the method is applied to a terminal device and includes:

receiving a WUS when the terminal device is configured with at least two DRX groups;

where the WUS is used to indicate whether to start onDuration timers in the next DRX cycles of all of the at least two DRX groups.

According to a second aspect, an embodiment of the present disclosure further provides a wake up signal configuration method, where the method is applied to a network side device and includes:

configuring a WUS for a terminal device when configuring at least two DRX groups for the terminal device;

where the WUS is used to indicate whether to start onDuration timers in the next DRX cycles of all of the at least two DRX groups.

According to a third aspect, an embodiment of the present disclosure further provides a terminal device. The terminal device includes:

a receiving module, configured to receive a WUS when the terminal device is configured with at least two DRX groups;

where the WUS is used to indicate whether to start onDuration timers in the next DRX cycles of all of the at least two DRX groups.

According to a fourth aspect, an embodiment of the present disclosure further provides a network side device. The network side device includes:

a configuration module, configured to configure a WUS for a terminal device when configuring at least two DRX groups for the terminal device;

where the WUS is used to indicate whether to start onDuration timers in the next DRX cycles of all of the at least two DRX groups.

According to a fifth aspect, an embodiment of the present disclosure further provides a terminal device, including a processor, a memory, and a computer program stored in the memory and executable on the processor, where when the computer program is executed by the processor, the steps of the WUS processing method provided in the first aspect are implemented.

According to a sixth aspect, an embodiment of the present disclosure further provides a network side device, including a processor, a memory, and a computer program stored in the memory and executable on the processor, where when the computer program is executed by the processor, the steps of the wake up signal configuration method provided in the second aspect are implemented.

According to a seventh aspect, an embodiment of the present disclosure further provides a computer-readable storage medium, where the computer-readable storage medium stores a computer program, and when the computer program is executed by a processor, the steps of the WUS processing method provided in the first aspect or the steps of the wake up signal configuration method provided in the second aspect are implemented.

In the embodiments of the present disclosure, when the terminal device is configured with multiple DRX groups, the terminal device receives the WUS used to indicate whether to start onDuration timers in the next DRX cycles of all DRX groups. Therefore, the terminal device may determine, based on the WUS, whether to start the onDuration timer in the next DRX cycle of each DRX group. Embodiments of the present disclosure provide a simple WUS indication solution when a terminal device is configured with multiple DRX groups.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a structural diagram of a network system to which embodiments of the present disclosure can be applied;

FIG. 2 is a flowchart of a wake up signal processing method according to an embodiment of the present disclosure;

FIG. 3 is a first schematic diagram of configuration of a WUS in a DRX group according to an embodiment of the present disclosure;

FIG. 4 is a second schematic diagram of configuration of a WUS in a DRX group according to an embodiment of the present disclosure;

FIG. 5 is a flowchart of a wake up signal configuration method according to an embodiment of the present disclosure;

FIG. 6 is a structural diagram of a terminal device according to an embodiment of the present disclosure;

FIG. 7 is a structural diagram of a network side device according to an embodiment of the present disclosure;

DETAILED DESCRIPTION

Figure 8:
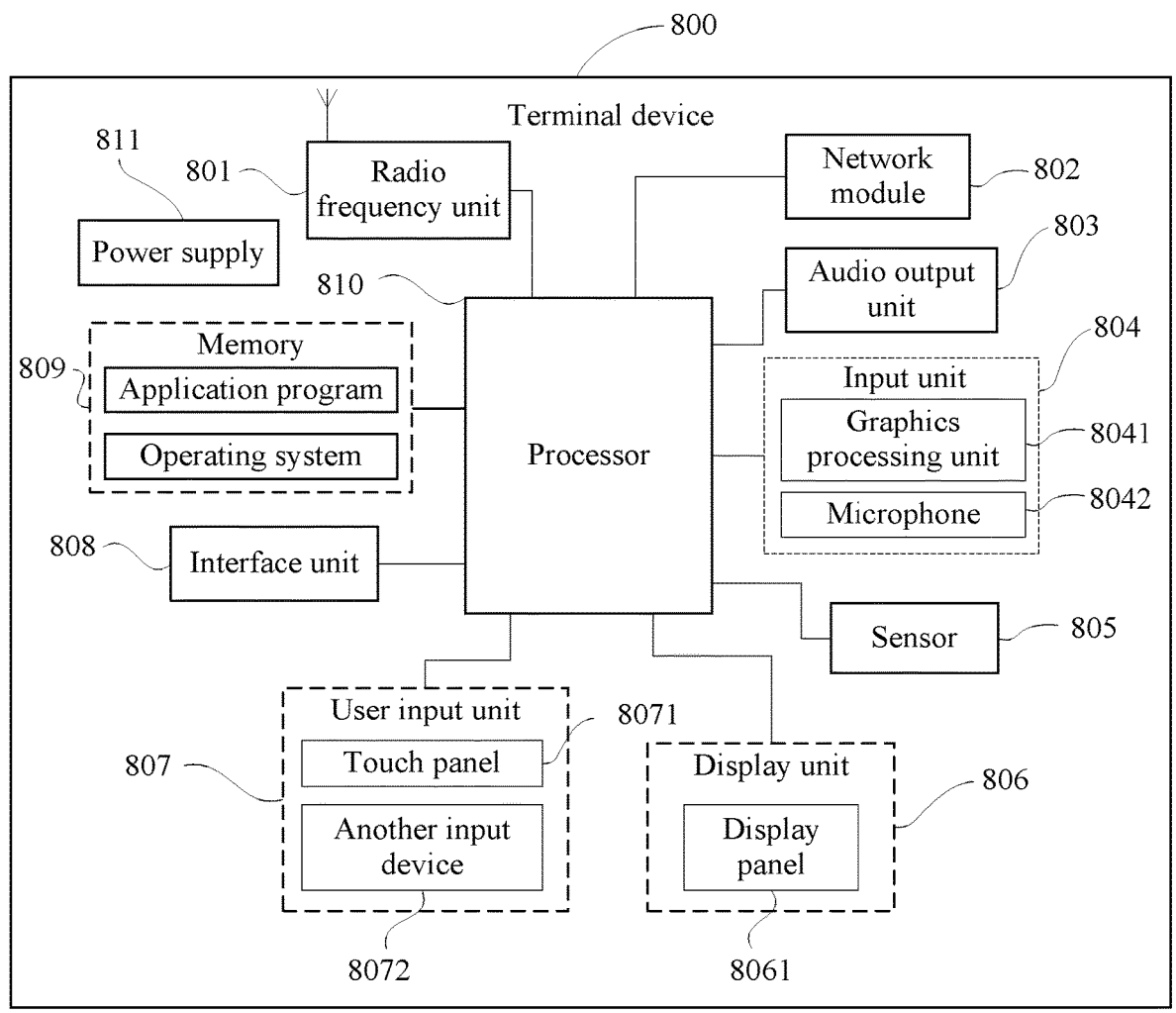
FIG. 8 is a structural diagram of a terminal device according to another embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first", "second", or the like in the specification and claims of this application are used to distinguish similar objects, instead of describing a specific sequence or order. It should be understood that data used in this way may be interchangeable in appropriate cases, so that the embodiments of this application described herein are implemented in a sequence other than those shown or described herein. In addition, terms "include", "have", and any variants thereof are intended to cover non-exclusive inclusion, for example, processes, methods, systems, products, or devices that contain a series of steps or units are unnecessarily limited to those steps or units that are clearly listed, but may include other steps or units that are not clearly listed or are inherent to these processes, methods, products, or devices. In addition, in the specification and claims, "and/or" is used to indicate at least one of connected objects, for example, A and/or B and/or C indicates seven cases: only A, only B, only C, both A and B, both B and C, both A and C, and A, B and C.

For ease of understanding the embodiments of the present disclosure, the following first describes some related concepts in the embodiments of the present disclosure.

1. DRX Technology

If a terminal device does not monitor a PDCCH control channel for a long time, a data transmission delay is increased once data arrives. To balance power saving and a transmission delay, according to the length of time in which the terminal device monitors a channel, the terminal device can support two DRX cycles: a long DRX cycle and a short DRX cycle. If predicting that a data volume of the terminal device is frequent or a service of the terminal device is sensitive to a delay, the network side device can configure that the terminal device uses a short DRX cycle. If predicting that a data volume of the terminal device is sparse and is insensitive to a delay, the network side device can configure that the terminal device uses only a long DRX cycle. To facilitate switching between the long DRX cycle and the short DRX cycle by the terminal device, it is required that the long DRX cycle is an integer multiple of the short DRX cycle, to ensure that onDuration of the long DRX cycle and onDuration of the short DRX cycle are aligned with each other.

To support the DRX mechanism, the network side device configures DRX-related timers and parameters for the terminal device, specifically including:

drx-LongCycleStartOffset: used to configure the cycle and the offset of a long DRX cycle, and the unit of the cycle and the offset is millisecond;

drx-ShortCycle: used to configure the cycle and the offset of a short DRX cycle, and the unit of the cycle and the offset is millisecond;

drx-ShortCycleTimer: used to control duration in which the terminal device uses a short DRX cycle, and the unit of the duration is an integer, indicating that once the terminal device enters the short DRX cycle, the terminal device needs to maintain the integer multiple of the short cycle;

drx-onDurationTimer: when a DRX onDuration timer operates, the terminal device needs to continuously monitor a PDCCH control channel of a network, and the unit of the timer is millisecond; and drx-SlotOffset: a delay of starting a drx-onDurationTimer by the terminal device. This parameter is used to set an offset of a start time of DRX onDuration relative to the start of a subframe. The offset is an integer multiple of $\frac{1}{32}$ millisecond.

2. WUS

The WUS serves to inform the terminal device whether to monitor a PDCCH in a specific DRX onDuration. When there is no data, the terminal device may not need to monitor a PDCCH in the onDuration, which is equivalent to that the terminal device can be in a sleep state throughout the entire DRX long cycle, to further save power.

The WUS is a downlink physical control channel (DCI), and is abbreviated as DCP (DCI with CRC scrambled by PS-RNTI). The power-saving radio network temporary identifier PS-RNTI is an RNTI specially allocated by the network for the terminal device to save power. The DCI scrambled by the RNTI carries a wake up/sleep indicator provided by the network to the terminal device. The terminal device determines, according to the indicator, whether to start an onDuration timer in the next DRX cycle and whether to monitor a PDCCH.

FIG. 1 is a structural diagram of a network system to which an embodiment of the present disclosure may be applied. As shown in FIG. 1, the network system includes a terminal device 11 and a network side device 12. The terminal device 11 may be a device on a user side such as a mobile phone, a tablet computer, a laptop computer, a Personal Digital Assistant (PDA), a Mobile Internet Device (MID), or a wearable device. It should be noted that a specific type of the terminal device 11 is not limited in this embodiment of the present disclosure. The network side device 12 may be a base station, for example, a macro base station, a Long Term Evolution (LTE) eNB, a 5G NR NB, or a gNB. The network side device 12 may be alternatively a small cell, for example, a Low Power Node (LPN) of pico or femto, or the network side device 12 may be an Access Point (AP). The base station may be alternatively a network node formed by a Central Unit (CU) and multiple TRPs that are managed and controlled by the CU. It should be noted that a specific type of the network side device 12 is not limited in this embodiment of the present disclosure. The network system may be a 5G communications system or an LTE communications system, which may not be specifically limited.

It should be noted that the wake up signal processing method provided by the embodiments of the present disclosure can be executed by the terminal device 11; and the wake up signal configuration method provided by the embodiments of the present disclosure can be executed by the network side device 12. Details are described below.

An embodiment of the present disclosure provides a WUS processing method, applied to a terminal device. FIG. 2 is a flowchart of a WUS processing method according to an embodiment of the present disclosure. As shown in FIG. 2, the method includes the following step:

Step 201: Receive a WUS when the terminal device is configured with at least two DRX groups.

The WUS is used to indicate whether to start onDuration timers in the next DRX cycles of all of the at least two DRX groups.

In this embodiment of the present disclosure, the terminal device may be configured with multiple DRX groups. A WUS is configured in one of the DRX groups, one WUS controls the at least two DRX groups to work together, and the WUS may indicate whether to start the onDuration timers in the next DRX cycles of all of the at least two DRX groups.

Different DRX groups of the at least two DRX groups may be understood as different carrier groups configured with different DRX parameter sets. The DRX parameter set may include a set of DRX parameters. In practical application, Component Carriers (CCs) with different characteristics may be configured as different DRX groups, and a corresponding DRX parameter set may be configured for each DRX group.

Specifically, the network side device may configure DRX parameters for User Equipment (UE) when the terminal device determines that a power-saving configuration is required according to service characteristics and characteristics of the terminal device. When the UE is configured with/activates multiple CCs, if the CCs have different characteristics, for example, some are at a low frequency and some are at a high frequency, transmission characteristics of the two types of CCs, such as parameter sets (namely, the numerology) for transmission are very different. In this case, a more efficient method is to configure two sets of different DRX parameters for the UE, where the two sets of different DRX parameters are respectively used for the CC groups with different characteristics. For example, all carriers at a low frequency (for example, FR1) is configured as DRX group 1 and a set of DRX parameters is configured for CCs in DRX group 1, while other carriers at a high frequency (for example, FR2) is configured as DRX group 2 and another set of DRX parameters is configured for CCs in DRX group 2. This is equivalent to configuring two sets of DRX parameters for the UE, where the two sets of DRX parameters are respectively used for two CC groups. The UE can start and maintain corresponding DRX states respectively for the two DRX groups according to the DRX parameter configuration.

Each set of DRX parameters may include parameters such as a DRX cycle (a long DRX cycle, a short DRX cycle, or the like), an offset, a duration in which UE uses a short DRX cycle, a DRX onDuration timer, and a delay of starting a DRX onDuration timer by the UE.

Therefore, in this embodiment, when the terminal device is configured with at least two DRX groups, the terminal device can receive the WUS sent by the network side device, and may start or may not start the onDuration timers in the next DRX cycles of all of the at least two DRX groups according to the indication of the WUS. Specifically, when the WUS indicates to start the onDuration timers in the next DRX cycles of all the DRX groups (for example, the WUS is WUS on for indicating wakeup), the onDuration timers in the next DRX cycles of all the DRX groups are simultaneously started. When the WUS indicates not to start the onDuration timers in the next DRX cycles of all the DRX groups (for example, the WUS is WUS off for indicating sleep), the onDuration timers in the next DRX cycles of all the DRX groups are not started.

It should be noted that when the terminal device is configured with multiple sets of DRX configurations and one WUS is configured, the WUS is generally configured in a Primary cell (Pcell)/Special cell (Spcell). A DRX group of the Pcell is called a Pcell DRX group or a primary DRX group, and another DRX group is called a Secondary cell (Scell) DRX group or a secondary DRX group. A common bit in the WUS can be used to indicate wakeup/sleep of multiple DRX groups.

An example of a specific implementation of the embodiments of the present disclosure is described below with reference to FIG. 3. As shown in FIG. 3, the network side device configures two DRX groups for the UE, and configures one WUS in DRX group 1. The following describes in detail how the two DRX groups are controlled by one WUS to perform wakeup and sleep operations desired by the network side device.

FIG. 3 is an optional running state of timers configured in two DRX groups. DRX group 1 and DRX group 2 can have different timers, for example, onDuration timers, Inactivity timers, Hybrid Automatic Repeat reQuest (HARQ) Round Trip Time (RTT) timers, or HARQ Retransmission (RETX) timers. Parameters such as whether the short DRX cycle is started, a duration configuration thereof, and a DRX cycle offset can have different values. The final objective is that the two DRX groups independently maintain DRX states and timers according to timer and parameter configurations of the two DRX groups based on data scheduling and retransmission statuses.

On the basis of configuration of multiple DRX groups, if a WUS needs to be configured to dynamically indicate whether to wake up/sleep an onDuration timer and monitor a PDCCH in each DRX cycle, a feasible method is to select a CC from all configured/activated CCs to configure the WUS. Generally, a Pcell or a Spcell is selected, that is, the WUS is configured in a DRX group. For example, in FIG. 3, if the Pcell/Spcell belongs to DRX group 1, the WUS is monitored in a special cell in DRX group 1.

The two DRX groups are controlled by one WUS to work together in the following basic manner:

UE monitors (receives) the WUS on a time-frequency resource configured for the WUS, and according to content indicated by the WUS, determines whether to start the onDuration timer in the next DRX cycle (as shown in FIG. 2, an adjacent DRX cycle after the time-domain location of WUS on/WUS off in DRX group 1) of DRX group 1 and whether to monitor a PDCCH. Although there are two DRX groups at this time, both groups need to be controlled by one WUS at the same time. Therefore, although no WUS is configured in DRX group 2, the indication of the WUS located in DRX group 1 can also be applied to determine a timer status and a PDCCH monitoring status of DRX group 2. This can achieve the following objective: when the UE does not need to transmit a service, a WUS can indicate cells in both DRX groups at the same time to be in a sleep state in the next DRX cycle, to further save power of the UE. Only when a service needs to be transmitted, the WUS can indicate the cells in both DRX groups to start the onDuration timer and PDCCH monitoring in the next DRX cycle, and prepare for data transmission.

In some embodiments, after the receiving a WUS, the method further includes:

determining, according to the WUS, whether to start onDuration timers in the next DRX cycles of all of the at least two DRX groups.

After receiving the WUS, the UE may also determine, according to an indication of the WUS, whether to start an onDuration timers in the next DRX cycles of all of the at least two DRX groups. Specifically, when the WUS is a wake up indicator (for example, an indication value of the received WUS is on), it is determined to start the onDuration timers in the next DRX cycles of all DRX groups. When the WUS is a sleep indicator (for example, the indication value of the received WUS is off), it is determined not to start the onDuration timers in the next DRX cycles of all DRX groups. Furthermore, according to a determining result, the UE may start the onDuration timers in the next DRX cycles of all DRX groups, or may not start the onDuration timers in the next DRX cycles of all DRX groups.

In some embodiments, before the receiving a WUS, the method further includes:

determining, according to statuses of some or all of the at least two DRX groups, whether to receive the WUS.

In the process of using the WUS to control the wakeup/sleep state of multiple DRX groups, special cases need to be further considered and resolved. For example, when a data service is being performed in some DRX groups of the UE, these DRX groups are already in the wakeup working state. In this case, it can be considered whether to monitor the WUS, that is, receive the WUS.

Therefore, in this implementation, before receiving the WUS, it may be determined, according to the statuses of some or all of the at least two DRX groups, whether to receive the WUS. If it is determined to receive the WUS, the UE receives the WUS; otherwise, the UE may not receive the WUS, that is, give up receiving the WUS.

Specifically, it may be determined, according to whether some or all of the at least two DRX groups are currently in an active state (that is, a wakeup state) or in an inactive state (that is, a sleep state), whether to receive the WUS. More specifically, when some or all of the at least two DRX groups are currently in an active state, it may be determined not to receive the WUS. When some or all of the at least two DRX groups are currently in an inactive state, it may be determined to receive the WUS.

Further, when it is determined not to receive the WUS, considering that some or all of the DRX groups are currently in an active state, it is determined that some or all of the DRX groups of the UE are more likely to perform a service in the next DRX cycle. Therefore, to ensure the normal operation of the service of the UE and reduce the transmission delay, the onDuration timers in the next DRX cycles of all the DRX groups can be directly started without monitoring the WUS.

In this way, it is determined, according to the statuses of some or all of the at least two DRX groups, whether to receive the WUS, to further save transmission resources and save more power without affecting the service of the terminal.

In some embodiments, the determining, according to statuses of some or all of the at least two DRX groups, whether to receive the WUS may include any one of the following:

in a case that a time domain location of the WUS is in active time of a first DRX group, determining not to receive the WUS; otherwise, determining to receive the WUS; where the first DRX group is a DRX group configured with the WUS in the at least two DRX groups;

in a case that a time domain location of the WUS is in active time of all of the at least two DRX groups, determining not to receive the WUS; otherwise, determining to receive the WUS; and in a case that a time domain location of the WUS is in active time of any one of the at least two DRX groups, determining not to receive the WUS; otherwise, determining to receive the WUS.

In this implementation, it may be determined, according to the overlapping status of the time domain location of the WUS and Active time of some or all of the at least two DRX groups, whether to receive the WUS or whether not to receive the WUS.

When the time domain location of the configured WUS overlaps with the active time, that is, the time location in which the WUS needs to be monitored, because the UE is still in the active monitoring state, that is, the PDCCH onDuration state due to the scheduling of the previous DRX cycle, the UE does not need to monitor the WUS and directly enters the onDuration state, that is, starts the onDuration timer and monitors the PDCCH in the next DRX cycle.

In a manner, it may be only considered whether the Primary DRX group is in active time, to determine whether the WUS is within the active time, that is, whether the time domain location of the WUS conflicts with the active time. Then, it is determined, according to whether the time domain location of the WUS conflicts with the active time, whether to monitor the WUS. The primary DRX group can be a DRX group configured with the WUS in the at least two DRX groups.

Specifically, when the WUS is configured in the first DRX group of the at least two DRX groups, when the time domain location of the WUS is in the active time of the first DRX group, that is, the time domain location of the WUS overlaps with the active time of the first DRX group, it may be determined that the time domain location of the WUS conflicts with the active time of the first DRX group, thereby determining not to receive the WUS. However, when the time domain location of the WUS is not in the active time of the first DRX group, in other words, the time domain location of the WUS is in a Non-Active time of the first DRX group, that is, the time domain location of the WUS does not overlap with the active time of the first DRX group, it may be determined that the time domain location of the WUS does not conflict with the active time of the first DRX group, thereby determining to receive the WUS.

In another manner, the active time of each of the at least two DRX groups can be considered at the same time to determine whether the time domain location of the WUS conflicts with the active time, and then it is determined, according to whether the time domain location of the WUS conflicts with the active time, whether to monitor the WUS. Specifically, there may be two different cases as follows:

In one case, when the time domain location of the WUS is in an overlapped area of the active time of each of the at least two DRX groups, that is, the time domain location of the WUS overlaps with the active time of each DRX group, it may be determined that the time domain location of the WUS conflicts with the active time of each DRX group, thereby determining not to receive the WUS. However, when the time domain location of the WUS is not in the active time of each DRX group, that is, the active time of at least one DRX group does not overlap with the time domain location of the WUS, it may be determined that the time domain location of the WUS does not conflict with the active time of the at least two DRX groups, thereby determining to receive the WUS.

In the other case, when the time domain location of the WUS is in the active time of any one of the at least two DRX groups, that is, the active time of at least one DRX group overlaps with the time domain location of the WUS, it may be determined that the time domain location of the WUS conflicts with the active time of the at least two DRX groups, thereby determining not to receive the WUS. However, when the time domain location of the WUS is not in the active time of any DRX group, that is, the time domain location of the WUS is in a non-active time of each DRX group and there is no DRX group whose active time conflicts with the time domain location of the WUS, it may be determined that the time domain location of the WUS does not conflict with the active time of the at least two DRX groups, thereby determining to receive the WUS.

Further, in a case of determining not to receive the WUS, the method may further include one of the following:

starting an onDuration timer in the next DRX cycle of each of the at least two DRX groups; and in a case of determining not to receive the WUS, starting an onDuration timer in the next DRX cycle of a second DRX group of the at least two DRX groups, where the second DRX group is a DRX group configured with the WUS in the at least two DRX groups, or the second DRX group is a DRX group whose active time overlaps with the time domain location of the WUS in the at least two DRX groups.

It is determined above not to receive the WUS because the time domain location of the WUS is in the active time of some or all of the DRX groups and this causes conflict, and the WUS does not need to be monitored. That is, some or all of the DRX groups are currently performing services. Therefore, it may be predicted that the UE is more likely to perform a service in the next DRX cycle. Therefore, to ensure the normal operation of the service of the UE and reduce the transmission delay, the onDuration timers in the next DRX cycles of some or all of the at least two DRX groups can be directly started without monitoring the WUS.

In an implementation, in a case of determining not to receive the WUS, onDuration timers in the next DRX cycles of all of the at least two DRX groups can be directly started. This can be simply implemented and can reduce the transmission delay.

In another implementation, in a case of determining not to receive the WUS, only the onDuration timer in the next DRX cycle of a particular DRX group of the at least two DRX groups may be started. For example, only the onDuration timer in the next DRX cycle of the DRX group configured with the WUS in the at least two DRX groups may be started, or only the onDuration timer in the next DRX cycle of the DRX group whose active time overlaps with the time domain location of the WUS in the at least two DRX groups may be started. This can reduce the transmission delay while saving power.

This implementation is described below by using an example in which the UE is configured with two DRX groups (Primary DRX group and Secondary DRX group). Since the activation statuses of the two DRX groups are independent from each other, the relationship between the two DRX groups and the configured time domain location of the WUS has four cases as follows:

Case 1: in the configured time domain location of the WUS, the status of the primary DRX group (that is, the group with the WUS) is active time, and the status of the secondary DRX group (that is, the group without the WUS) is non-active time;

Case 2: in the configured time domain location of the WUS, the status of the primary DRX group is active time, and the status of the secondary DRX group is also active time;

Case 3: in the configured time domain location of the WUS, the status of the primary DRX group is non-active time, and the status of the secondary DRX group is active time; and Case 4: in the configured time domain location of the WUS, the status of the primary DRX group is non-active time, and the status of the secondary DRX group is also non-active time.

The statuses of the primary DRX group and the secondary DRX group can correspond to the four cases shown in the following table.

TABLE 1

Statuses of two DRX groups

| | Primary DRX group | Secondary DRX group |
|---|---|---|
| Case 1 | Active time | Non-active time |
| Case 2 | Active time | Active time |
| Case 3 | Non-active time | Active time |
| Case 4 | Non-active time | Non-active time |

Then, there are the following two methods for defining the conflict between the time domain location of the WUS and the active time, and determining a relevant WUS monitoring behavior according to whether there is conflict:

Method 1: it is only considered whether the primary DRX group is in the active time to determine whether the WUS is in the active time:

In case 1 and case 2, it is determined that there is conflict, the UE does not need to monitor the WUS in the configured time-frequency location of the WUS, and the two DRX groups simultaneously start the onDuration timers and simultaneously monitor PDCCHs by default in the next DRX cycle.

In case 3 and case 4, it is determined that there is no conflict, the UE needs to monitor the WUS in the configured time-frequency location of the WUS, and determines, according to the indication of the WUS, for example, on or off, whether the two DRX groups simultaneously start the onDuration timers and simultaneously monitor PDCCHs in the next DRX cycle.

It should be noted that, in this method, only the status of the primary DRX group is considered. Therefore, when the status of the secondary DRX group is inconsistent with the status of the primary DRX group, for example, in case 3, when the WUS indicates off, although the secondary DRX group currently is still in the active time, after the timer that currently causes the UE to enter the active time expires, the UE also enters the sleep state in the secondary DRX group since the onDuration timer is no longer started in the next DRX cycle.

Method 2: both the active time of the primary DRX group and the active time of the secondary DRX group are considered. This method is divided into two branches:

Branch 1: Only when the two DRX groups are in the active time in the time domain location of the WUS (that is, case 2), it is determined that the WUS conflicts with the active time. In the remaining cases (case 1, case 3, and case 4), it is determined that the WUS does not conflict with the active time.

Branch 2: Only when the two DRX groups are in the non-active time in the time domain location of the WUS (that is, case 4), it is determined that the WUS does not conflict with the active time. In the remaining cases (case 1, case 2, and case 3), it is determined that the WUS conflicts with the active time.

When it is determined that the WUS conflicts with the active time, the UE does not need to monitor the WUS in the configured time-frequency location of the WUS, and the two DRX groups simultaneously start the onDuration timers and simultaneously monitor PDCCHs by default in the next DRX cycle.

When it is determined that the WUS does not conflict with the active time, the UE needs to monitor the WUS in the configured time-frequency location of the WUS, and determines, according to the indication of the WUS, for example, on or off, whether the two DRX groups simultaneously start the onDuration timers and simultaneously monitor PDCCHs in the next DRX cycle.

In this way, based on the relationship between the time domain location of the WUS and the active time of some or all of the at least two DRX groups, it is determined whether the WUS conflicts with the at least two DRX groups, to determine whether the WUS is received. This can effectively save transmission resources and power.

In some embodiments, the method further includes any one of the following:

in a case that reception of the WUS fails, determining, according to a first indicator, whether to start onDuration timers in the next DRX cycles of some or all of the at least two DRX groups; where the first indicator is predefined in a protocol or configured by a network side device;

in a case that reception of the WUS fails, starting onDuration timers in the next DRX cycles of some or all of the at least two DRX groups; and in a case that reception of the WUS fails, determining, according to a status of at least one of the at least two DRX groups, whether to start onDuration timers in the next DRX cycles of some or all of the at least two DRX groups.

After the network side device configures the time-frequency location of the WUS for the UE, the UE needs to perform WUS detection at the configured time-frequency location of the WUS, that is, receive the WUS. However, in actual transmission, the quality of a communication link may be poor, or the UE needs to perform other high-priority operations. As a result, the UE does not correctly detect the WUS, that is, fails to receive the WUS. Therefore, it cannot be known whether the network side device notifies a wakeup indicator or a sleep indicator in the next DRX cycle. In this case, The behavior of the UE in the at least two DRX groups needs to be clearly specified to ensure that the behavior of the UE can be controlled by the network side device.

This implementation provides a corresponding processing solution to how the UE performs a monitoring behavior in the next DRX cycle in the at least two DRX groups in a case that reception of the WUS fails. Specifically, there may be the following three different processing solutions.

In the first method, a corresponding indicator can be pre-configured to inform the UE how to determine a monitoring behavior. Specifically, the first indicator can be predefined by a protocol or configured by a network side device to indicate whether the UE starts the onDuration timers in the next DRX cycles of some or all of the at least two DRX groups in a case that reception of the WUS fails. When the network side device configures the first indicator for the UE, the network side device may deliver the configured first indicator to the UE, so that the UE may determine, according to the first indicator in a case that reception of the WUS fails, DRX groups whose onDuration timers in the next DRX cycles need to be started in the at least two DRX groups.

That is, the first indicator may instruct the UE to only start the onDuration timers in the next DRX cycles of some of the at least two DRX groups, for example, start only the onDuration timer in the next DRX cycle of a primary DRX group, a DRX group configured with the WUS, or a DRX group currently having data scheduling, to ensure the service of the terminal and save transmission resources. Alternatively, the first indicator may instruct the UE to start the onDuration timers in the next DRX cycles of all of the at least two DRX groups, to preferentially ensure the service transmission of the terminal. Alternatively, the first indicator may instruct the UE not to start the onDuration timers in the next DRX cycles of some of the at least two DRX groups, for example, not to start the onDuration timer in the next DRX cycle of a non-primary DRX group, a DRX group not configured with the WUS, or a DRX group currently having no data scheduling, to save transmission resources and power. Alternatively, the first indicator may instruct the UE not to start the onDuration timers in the next DRX cycles of all of the at least two DRX groups, to preferentially save transmission resources and power.

The first indicator may include one sub-indicator, and the sub-indicator corresponds to all of the at least two DRX groups; or the first indicator includes at least two sub-indicators, and the at least two sub-indicators respectively correspond to different DRX groups of the at least two DRX groups.

That is, a same indicator may be configured for the at least two DRX groups to instruct the UE to simultaneously start or not start the onDuration timers in the next DRX cycles of all DRX groups, or an independent indicator may be configured for each of the at least two DRX groups, or a same indicator may configured for some of the at least two DRX groups, or a same indicator may be configured for some of the at least two DRX groups and an independent indicator may be configured for each of the other of the at least two DRX groups, or the like, to instruct the UE to simultaneously start or not start onDuration timers in the next DRX cycles of some DRX groups, or instruct the UE to separately start or not start the onDuration timer in the next DRX cycle of a particular DRX group.

For example, the network side device may configure, through Radio Resource Control (RRC) signaling for the UE, whether the at least two DRX groups are in a wakeup state or a sleep state when the UE does not detect/misdetects the WUS. The network side device may configure a same WUS misdetection state indicator for the primary DRX group and the secondary DRX group, or may configure independent WUS misdetection state indicators for the primary DRX group and the secondary DRX group.

For example, when the same WUS misdetection state indicator is configured as on, if the UE misdetects the WUS, the UE simultaneously starts the onDuration timers in the next DRX cycles of the two DRX groups by default, and simultaneously monitors the PDCCH; when the same WUS misdetection state indicator is configured as off, if the UE misdetects the WUS, the UE simultaneously does not start the onDuration timers in the next DRX cycles of the two DRX groups by default, and simultaneously does not monitor the PDCCH.

When independent WUS misdetection state indicators are separately configured, if the UE misdetects the WUS, the UE independently determines, according to the independent indicators configured for the DRX groups, whether to start the onDuration timers in the next DRX cycles and whether to monitor a PDCCH.

In the second method, the UE may determine a monitoring behavior according to a preset rule. Specifically, in a case that reception of the WUS fails, the UE may start onDuration timers in the next DRX cycles of some or all of the at least two DRX groups.

That is, the UE may only start onDuration timers in the next DRX cycles of some of the at least two DRX groups, for example, start only the onDuration timer in the next DRX cycle of a primary DRX group, a DRX group configured with the WUS, or a DRX group currently having data scheduling, to ensure the service of the UE and save transmission resources. Alternatively, the UE may start the onDuration timers in the next DRX cycles of all of the at least two DRX groups, to preferentially ensure the service transmission of the UE.

Further, in a case that reception of the WUS fails, the starting onDuration timers in the next DRX cycles of some or all of the at least two DRX groups includes any one of the following:
  starting an onDuration timer in the next DRX cycle of each of the at least two DRX groups in a case that reception of the WUS fails; and
  starting an onDuration timer in the next DRX cycle of a third DRX group in a case that reception of the WUS fails; where the third DRX group is a DRX group configured with the WUS in the at least two DRX groups.

In this method, because the probability of WUS misdetection is not high, a simple and direct behavior of the UE is that the UE wakes up by default. That is, if WUS misdetection occurs in the UE, in the next DRX cycle, the UE starts the onDuration timers of all DRX groups by default and monitors a PDCCH, to avoid missing the scheduling of the network side device, and improve the service transmission experience and reduce the delay. Besides, because the probability of WUS misdetection is not high, this has little impact on power consumption.

Alternatively, to balance service transmission experience, the delay, and power consumption, the UE may wake up only in the DRX group configured with the WUS in the at least two DRX groups by default. When the WUS is configured in the primary DRX group, the UE may wake up only in the primary DRX group. For example, when the UE has no data transmission in the previous DRX cycles of the at least two DRX groups, WUS misdetection occurs. In this case, the UE wakes up only in the primary DRX group to monitor possible data scheduling and still maintains the power-saving sleep state in another DRX group.

In the third method, the UE may determine a monitoring behavior according to a status of at least one of the at least two DRX groups. Specifically, in a case that reception of the WUS fails, the UE may determine, according to whether the at least one of the at least two DRX groups is currently in an active state or an inactive state, whether to start onDuration timers in the next DRX cycles of some or all of the at least two DRX groups. The at least one DRX group may be a primary DRX group, a DRX group configured with the WUS, or a DRX group currently having data scheduling of the at least two DRX groups. The some of the at least two DRX groups may be DRX groups corresponding to the at least one DRX group, or may be a primary DRX group, a DRX group configured with the WUS, or a DRX group currently having data scheduling of the at least two DRX groups.

That is, the UE may determine, according to the status of at least one of the at least two DRX groups, whether to start the onDuration timers in the next DRX cycles of some of the at least two DRX groups. For example, when some of at least two DRX groups are in active time in the time domain location of the WUS, the UE can determine that the some DRX groups are very likely to have data scheduling in the next DRX cycle. Therefore, onDuration timers in the next DRX cycle of the some DRX groups can be started. Alternatively, the UE may determine, according to the status of at least one of the at least two DRX groups, whether to start the onDuration timers in the next DRX cycle of all of the at least two DRX groups. For example, when some or all of the at least two DRX groups are in active time in the time domain location of the WUS, the onDuration timers in the next DRX cycles of all the DRX groups can be directly started.

Further, the determining, according to a status of at least one of the at least two DRX groups in a case that reception of the WUS fails, whether to start onDuration timers in the next DRX cycles of some or all of the at least two DRX groups includes:
  in a case that reception of the WUS fails, if the time domain location of the WUS is in active time of a fourth DRX group, starting an onDuration timer in the next DRX cycle of the fourth DRX group;
  where the fourth DRX group is any one of the at least two DRX groups.

That is, in a case that reception of the WUS fails, the UE may start the onDuration timer in the next DRX cycle of a DRX group whose active time overlaps with the time domain location of the WUS in the at least two DRX groups, and may not start the onDuration timer in the next DRX cycle of another DRX group.

Two DRX groups are used as an example. The UE can determine, according to the statuses of the two DRX groups, whether to wake up the DRX groups. For example, when a DRX group is in active time in the time domain duration of the WUS, it is considered that the DRX group is very likely to have data scheduling in the next DRX cycle. In the next DRX cycle, the UE starts the onDuration timer of the DRX group by default and monitors a PDCCH. When a DRX group is in non-active time in the time domain duration of the WUS, it is considered that the DRX group is very likely to sleep in the next DRX cycle. In the next DRX cycle, the UE does not start the onDuration timer of the DRX group by default and does not monitor a PDCCH.

In this way, in a case that reception of the WUS fails, the monitoring behaviors of the at least two DRX groups in the next DRX cycle are determined by adopting any one of the above solutions. This can ensure that the behavior of the UE can be controlled by the network side device, and can ensure the normal operation of the service of the terminal or save transmission resources of the terminal.

In some embodiments, a fifth DRX group is configured with a parameter of a long DRX cycle and a parameter of a short DRX cycle, the long DRX cycle is an integer multiple of the short DRX cycle, and the fifth DRX group is any one of the at least two DRX groups; and the method further includes one of the following:
in a case that the fifth DRX group works in the short DRX cycle, in a case that only a WUS time window before onDuration of the long DRX cycle is configured with the time domain location of the WUS, determining, according to a WUS received in the WUS time window before onDuration of the long DRX cycle, whether to start onDuration timers in all short DRX cycles within the range of the long DRX cycle; and
in a case that the fifth DRX group works in the short DRX cycle, in a case that a WUS time window before onDuration of each short DRX cycle is configured with the time domain location of the WUS, determining, according to a WUS received in the WUS time window before onDuration of each DRX cycle, whether to start an onDuration timer in each short DRX cycle.

To balance both power saving and the transmission delay, a DRX group can be configured with both a long DRX cycle and a short DRX cycle. When the data volume of the UE is frequent or the service is sensitive to a delay, the short DRX cycle can be used. When the data volume of the UE is sparse and the service is insensitive to the delay, only the long DRX cycle can be used. To facilitate switching between a long DRX cycle and a short DRX cycle, it may be configured that a long DRX cycle is an integer multiple of a short DRX cycle, to ensure that onDurations are aligned with each other.

In this implementation, when the fifth DRX group of the at least two DRX groups is configured with a parameter of the long DRX cycle and a parameter of the short DRX cycle and the fifth DRX group works in the short DRX cycle, the UE may determine, according to a relationship between the configured time domain location of the WUS and the time domain location of the long DRX cycle or the short DRX cycle of the fifth DRX group, whether to start the onDuration timer in the corresponding DRX cycle. The fifth DRX group is any one of the at least two DRX groups, and the long DRX cycle is an integer multiple of the short DRX cycle. In some embodiments, to improve convenience of monitoring the WUS, the fifth DRX group may be a DRX group configured with the WUS in the at least two DRX groups.

In an implementation, to save transmission resources, the network side device may only configure a WUS time window in each long DRX cycle of the fifth DRX group, to instruct, through a WUS, the UE to uniformly start or not start all onDuration timers in the long DRX cycle. In this way, the WUS only appears in the WUS time window before the onDuration of each long DRX cycle. In this case, the UE can monitor the WUS in the WUS time window before the onDuration of each long DRX cycle, and can determine, according to the monitored WUS, that is, the received WUS, whether to start the onDuration timers in all short DRX cycles within the range of the long DRX cycle.

For example, if the WUS received in the WUS time window before the onDuration of the long DRX cycle indicates wakeup, the UE may start onDuration timers in all short DRX cycles within the long DRX cycle. If the WUS received in the WUS time window before the onDuration of the long DRX cycle indicates sleep, the UE may not start onDuration timers in all short DRX cycles within the long DRX cycle. If a long DRX cycle includes N short DRX cycles, the UE may determine, according to the WUS received in the WUS time window before the onDuration of the long DRX cycle, whether to start N onDuration timers corresponding to the N short DRX cycles within the long DRX cycle.

In another implementation, to better indicate the behavior of the UE and avoid unnecessary wakeup or avoid indicating sleep when there is data scheduling, the network side device may configure a WUS time window in each short DRX cycle of the fifth DRX group, to instruct, through an independent WUS, the UE to start or not start the onDuration timer in the short DRX cycle. In this way, the WUS appears in the WUS time window before the onDuration of each short DRX cycle. In this case, the UE can monitor the WUS in the WUS time window before the onDuration of each short DRX cycle, and can determine, according to the monitored WUS, that is, the received WUS, whether to start the onDuration timer of each short DRX cycle.

For example, if the WUS received in the WUS time window before the onDuration of the short DRX cycle indicates wakeup, the UE may start the onDuration timer of the short DRX cycle. If the WUS received in the WUS time window before the onDuration of the short DRX cycle indicates sleep, the UE may not start the onDuration timer of the short DRX cycle. If a long DRX cycle includes N short DRX cycles, the UE may respectively determine, according to WUSs received in the WUS time windows before the onDurations of the N short DRX cycles, whether to start onDuration timers corresponding to the short DRX cycles.

It should be noted that, the specific implementation solutions of whether to receive the WUS in various different cases and the processing behavior of the UE in a case that reception of the WUS fails described in the foregoing implementations can all be applied to this implementation.

The short DRX cycle is used to more quickly switch between wakeup and sleep during data burst, so that data can be scheduled quickly when data arrives continuously. A long DRX cycle is an integral multiple of a short DRX cycle and offsets are the same. This facilitates switching between a long DRX cycle and a short DRX cycle.

For example, as shown in FIG. 4, the long DRX cycle is five times the short DRX cycle. After data transmission for a period of time ends, for example, after the inactivity timer expires, the UE enters the short DRX cycle. The location of a short protrusion shown in FIG. 4 is onDuration of the onDuration timer in each short DRX cycle. The onDuration timers in the short DRX cycle and the long DRX cycle have the same length. A configuration parameter of the short DRX cycle may specify the onDuration parameter of the short DRX cycle. If there is still no data transmission after N short DRX cycles, the UE returns to the long DRX cycle. Accordingly, if there is no data scheduling in the previous long DRX cycle, the UE is still in the long DRX cycle. However, if there is still no data scheduling after the short DRX cycle shown in FIG. 4, the UE enters the long DRX cycle again.

Since the short DRX cycle is related to a service, a short DRX cycle is only configured when a service requires a short delay. A DRX group configuration is related to a carrier. A carrier can also have a configuration binding relationship with service transmission. For example, only a service transmitted in the secondary DRX group requires configuration of the short DRX cycle. In this case, different short DRX cycle parameters can be configured for different DRX groups, for example, whether to start the short DRX cycle, and the number of continuous short cycles.

When the same short DRX cycle parameters or different short DRX cycle parameters are configured for two DRX groups, since data scheduling of the two DRX groups is inconsistent, the short DRX cycle can be maintained according to whether to start the short DRX cycle and specific parameters.

When the short DRX cycle is maintained independently in two DRX groups, the WUS can be executed in the following different methods:

Method 1: When the WUS only appears in the WUS time window (WUS window) before the onDuration of the long DRX cycle, that is, there is only one WUS time window location in one long DRX cycle, the WUS indicator or the various wakeup/sleep behaviors described in the foregoing embodiments can be applied to all possible onDuration timers in the long DRX cycle. As shown in FIG. 4, the WUS before the first long DRX cycle indicates on, and then the onDuration timer (implicitly included in the first long protrusion) in the long DRX cycle and the onDuration timers in the 4 short DRX cycles are all started and a PDCCH is monitored. The WUS before the onDuration of the second long DRX cycle indicates off, and then none of onDuration timers in the second long DRX cycle is started and no PDCCH is monitored.

Method 2: If a corresponding WUS is also configured before the onDuration of each short DRX cycle after the short DRX cycle is entered, whether the onDuration timer in each short DRX cycle is started is indicated by the corresponding WUS. In particular, if the WUS is only configured in the primary DRX group, to put it simply, after the primary DRX group enters a short DRX cycle, the UE monitors the WUS before the onDuration of each short DRX cycle.

In this way, when one of the at least two DRX groups is configured with a long DRX cycle and a short DRX cycle and the DRX group works in a short DRX cycle, the UE may receive the WUS according to the WUS time window configured in each DRX cycle, and determine, according to the received WUS, whether to start an onDuration timer in the corresponding DRX cycle, to effectively indicate how to perform a wake up or sleep behavior in the DRX group.

In the wake up signal processing method in this embodiment, when the terminal device is configured with multiple DRX groups, the terminal device receives the WUS used to indicate whether to start onDuration timers in the next DRX cycles of all DRX groups. Therefore, the terminal device may determine, based on the WUS, whether to start the onDuration timer in the next DRX cycle of each DRX group. Embodiments of the present disclosure provide a simple WUS indicator solution when a terminal device is configured with multiple DRX groups.

An embodiment of the present disclosure provides a WUS configuration method, applied to a network side device. FIG. 5 is a flowchart of a WUS configuration method according to an embodiment of the present disclosure. As shown in FIG. 5, the method includes the following step:

Step 501: Configure a WUS for a terminal device when configuring at least two DRX groups for the terminal device.

The WUS is used to indicate whether to start onDuration timers in the next DRX cycles of all the at least two DRX groups.

In this embodiment, when the network side device configures multiple DRX groups for the terminal device, one WUS may be configured for the terminal device, and the at least two DRX groups are controlled by one WUS to work together, that is, the WUS can indicate that all onDuration timers in the next DRX cycles of all of the at least two DRX groups start or sleep.

It should be noted that this embodiment is used as an implementation of the network side device corresponding to the embodiment shown in FIG. 2. For a specific implementation of this embodiment, refer to the related descriptions of the embodiment shown in FIG. 2. To avoid repeated descriptions, details are not described again in this embodiment.

In the wake up signal configuration method in this embodiment, when the terminal device is configured with at least two DRX groups, the terminal device is configured with the WUS used to indicate whether to start an onDuration timer in the next DRX cycles of all DRX groups. Therefore, the terminal device may determine, based on the WUS, whether to start the onDuration timer in the next DRX cycle of each DRX group. This provides a simpler WUS indicator solution.

In some embodiments, the method may further include:
sending a first indicator to the terminal device; where
the first indicator is used to indicate, in a case that reception of the WUS fails, whether to start onDuration timers in the next DRX cycles of some or all of the at least two DRX groups.

In some embodiments, the first indicator includes one sub-indicator, and the sub-indicator corresponds to all of the at least two DRX groups; or the first indicator includes at least two sub-indicators, and the at least two sub-indicators respectively correspond to different DRX groups of the at least two DRX groups.

For the foregoing optional implementation, refer to the related descriptions of the embodiment shown in FIG. 2. To avoid repeated descriptions, details are not described again in this embodiment.

FIG. 6 is a structural diagram of a terminal device according to an embodiment of the present disclosure. As shown in FIG. 6, a terminal device 600 includes:
a receiving module 601, configured to receive a WUS when the terminal device is configured with at least two DRX groups;
where the WUS is used to indicate whether to start onDuration timers in the next DRX cycles of all of the at least two DRX groups.

In some embodiments, the terminal device 600 further includes:
a first determining module, configured to determine, according to statuses of some or all of the at least two DRX groups, whether to receive the WUS.

In some embodiments, the first determining module is specifically configured to perform one of the following:
in a case that a time domain location of the WUS is in active time of a first DRX group, determine not to receive the WUS; otherwise, determine to receive the WUS; where the first DRX group is a DRX group configured with the WUS in the at least two DRX groups;
in a case that a time domain location of the WUS is in active time of all of the at least two DRX groups, determine not to receive the WUS; otherwise, determine to receive the WUS; and in a case that a time domain location of the WUS is in active time of any one of the at least two DRX groups, determine not to receive the WUS; otherwise, determine to receive the WUS.

In some embodiments, the terminal device 600 further includes: a first start module, specifically configured to perform one of the following:
in a case of determining not to receive the WUS, starting an onDuration timer in the next DRX cycle of each of the at least two DRX groups; and
in a case of determining not to receive the WUS, starting an onDuration timer in the next DRX cycle of a second DRX group of the at least two DRX groups, where the second DRX group is a DRX group configured with the WUS in the at least two DRX groups, or the second DRX group is a DRX group whose active time overlaps with the time domain location of the WUS in the at least two DRX groups.

In some embodiments, the terminal device 600 further includes:
a second determining module, configured to determine, according to the WUS, whether to start onDuration timers in the next DRX cycles of all of the at least two DRX groups.

In some embodiments, the terminal device 600 further includes one of the following:
a third determining module, configured to: in a case that reception of the WUS fails, determine, according to a first indicator, whether to start onDuration timers in the next DRX cycles of some or all of the at least two DRX groups; where the first indicator is predefined in a protocol or configured by a network side device;
a second start module, configured to: in a case that reception of the WUS fails, start onDuration timers in the next DRX cycles of some or all of the at least two DRX groups; and
a fourth determining module, configured to: in a case that reception of the WUS fails, determine, according to a status of at least one of the at least two DRX groups, whether to start onDuration timers in the next DRX cycles of some or all of the at least two DRX groups.

In some embodiments, the first indicator includes one sub-indicator, and the sub-indicator corresponds to all of the at least two DRX groups; or the first indicator includes at least two sub-indicators, and the at least two sub-indicators respectively correspond to different DRX groups of the at least two DRX groups.

In some embodiments, the second start module is specifically configured to perform one of the following:
starting an onDuration timer in the next DRX cycle of each of the at least two DRX groups in a case that reception of the WUS fails; and
starting an onDuration timer in the next DRX cycle of a third DRX group in a case that reception of the WUS fails; where the third DRX group is a DRX group configured with the WUS in the at least two DRX groups.

In some embodiments, the fourth determining module is specifically configured to: in a case that reception of the WUS fails, if the time domain location of the WUS is in active time of a fourth DRX group, start an onDuration timer in the next DRX cycle of the fourth DRX group;
where the fourth DRX group is any one of the at least two DRX groups.

In some embodiments, a fifth DRX group is configured with a parameter of a long DRX cycle and a parameter of a short DRX cycle, the long DRX cycle is an integer multiple of the short DRX cycle, and the fifth DRX group is any one of the at least two DRX groups; and
the terminal device 600 further includes: a fifth determining module, specifically configured to perform one of the following:
in a case that the fifth DRX group works in the short DRX cycle, in a case that only a WUS time window before onDuration of the long DRX cycle is configured with the time domain location of the WUS, determining, according to a WUS received in the WUS time window before onDuration of the long DRX cycle, whether to start onDuration timers in all short DRX cycles within the range of the long DRX cycle; and
in a case that the fifth DRX group works in the short DRX cycle, in a case that a WUS time window before onDuration of each short DRX cycle is configured with the time domain location of the WUS, determining, according to a WUS received in the WUS time window before onDuration of each DRX cycle, whether to start an onDuration timer in each short DRX cycle.

The terminal device 600 provided in this embodiment of the present disclosure can implement the processes that are implemented by the terminal device in the foregoing embodiment of the wake up signal processing method. To avoid repetition, details are not described herein again.

In the embodiments of the present disclosure, when the terminal device 600 is configured with multiple DRX groups, the terminal device receives the WUS used to indicate whether to start onDuration timers in the next DRX cycles of all DRX groups. Therefore, the terminal device may determine, based on the WUS, whether to start the onDuration timer in the next DRX cycle of each DRX group. This provides a simpler WUS indicator solution when the terminal device is configured with multiple DRX groups.

FIG. 7 is a structural diagram of a network side device according to an embodiment of the present disclosure. As shown in FIG. 7, the network side device 700 includes:
a configuration module 701, configured to configure a WUS for a terminal device when configuring at least two DRX groups for the terminal device;
where the WUS is used to indicate whether to start onDuration timers in the next DRX cycles of all of the at least two DRX groups.

In some embodiments, the network side device 700 further includes:
a send module, configured to send a first indicator to the terminal device; where
the first indicator is used to indicate, in a case that reception of the WUS fails, whether to start onDuration timers in the next DRX cycles of some or all of the at least two DRX groups.

In some embodiments, the first indicator includes one sub-indicator, and the sub-indicator corresponds to all of the at least two DRX groups; or the first indicator includes at least two sub-indicators, and the at least two sub-indicators respectively correspond to different DRX groups of the at least two DRX groups.

The network side device 700 provided in this embodiment of the present disclosure can implement the processes implemented by the network side device in the foregoing embodiment of the wake up signal configuration method. To avoid repetition, details are not described herein again.

In this embodiment of the present disclosure, when the network side device 700 configures at least two DRX groups for the terminal device, the network side device 700 configures, for the terminal device, the WUS used to indicate whether to start onDuration timers in the next DRX cycles of all DRX groups. Therefore, the terminal device may determine, based on the WUS, whether to start the onDuration timer in the next DRX cycle of each DRX group. This provides a simpler WUS indicator solution when the terminal device is configured with multiple DRX groups.

FIG. 8 is a structural diagram of another terminal device according to an embodiment of the present disclosure. As shown in FIG. 8, the terminal device 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. It can be understood by a person skilled in the art that, the terminal device structure shown in FIG. 8 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a laptop computer, a palmtop computer, an in-vehicle terminal, a wearable device, a pedometer, and the like.

The radio frequency unit 801 is configured to receive a WUS when the terminal device is configured with at least two DRX groups;
  where the WUS is used to indicate whether to start onDuration timers in the next DRX cycles of all of the at least two DRX groups.

In some embodiments, the processor 810 is configured to:
determine, according to statuses of some or all of the at least two DRX groups, whether to receive the WUS.

In some embodiments, the processor 810 is further configured to perform one of the following:
  in a case that a time domain location of the WUS is in active time of a first DRX group, determining not to receive the WUS; otherwise, determining to receive the WUS; where the first DRX group is a DRX group configured with the WUS in the at least two DRX groups;
  in a case that a time domain location of the WUS is in active time of all of the at least two DRX groups, determining not to receive the WUS; otherwise, determining to receive the WUS; and
  in a case that a time domain location of the WUS is in active time of any one of the at least two DRX groups, determining not to receive the WUS; otherwise, determining to receive the WUS.

In some embodiments, the processor 810 is further configured to perform one of the following:
  in a case of determining not to receive the WUS, starting an onDuration timer in the next DRX cycle of each of the at least two DRX groups; and
  in a case of determining not to receive the WUS, starting an onDuration timer in the next DRX cycle of a second DRX group of the at least two DRX groups, where the second DRX group is a DRX group configured with the WUS in the at least two DRX groups, or the second DRX group is a DRX group whose active time overlaps with the time domain location of the WUS in the at least two DRX groups.

In some embodiments, the processor 810 is further configured to:
  determine, according to the WUS, whether to start onDuration timers in the next DRX cycles of all of the at least two DRX groups.

In some embodiments, the processor 810 is further configured to perform one of the following:
  in a case that reception of the WUS fails, determining, according to a first indicator, whether to start onDuration timers in the next DRX cycles of some or all of the at least two DRX groups; where the first indicator is predefined in a protocol or configured by a network side device;
  in a case that reception of the WUS fails, starting onDuration timers in the next DRX cycles of some or all of the at least two DRX groups; and
  in a case that reception of the WUS fails, determining, according to a status of at least one of the at least two DRX groups, whether to start onDuration timers in the next DRX cycles of some or all of the at least two DRX groups.

In some embodiments, The first indicator includes one sub-indicator, and the sub-indicator corresponds to all of the at least two DRX groups; or the first indicator includes at least two sub-indicators, and the at least two sub-indicators respectively correspond to different DRX groups of the at least two DRX groups.

In some embodiments, the processor 810 is further configured to perform one of the following:
  starting an onDuration timer in the next DRX cycle of each of the at least two DRX groups in a case that reception of the WUS fails; and
  starting an onDuration timer in the next DRX cycle of a third DRX group in a case that reception of the WUS fails; where the third DRX group is a DRX group configured with the WUS in the at least two DRX groups.

In some embodiments, the processor 810 is further configured to:
  in a case that reception of the WUS fails, if the time domain location of the WUS is in active time of a fourth DRX group, start an onDuration timer in the next DRX cycle of the fourth DRX group;
  where the fourth DRX group is any one of the at least two DRX groups.

In some embodiments, a fifth DRX group is configured with a parameter of a long DRX cycle and a parameter of a short DRX cycle, the long DRX cycle is an integer multiple of the short DRX cycle, and the fifth DRX group is any one of the at least two DRX groups; and
  the processor 810 is further configured to perform one of the following:
  in a case that the fifth DRX group works in the short DRX cycle, in a case that only a WUS time window before onDuration of the long DRX cycle is configured with the time domain location of the WUS, determining, according to a WUS received in the WUS time window before onDuration of the long DRX cycle, whether to start onDuration timers in all short DRX cycles within the range of the long DRX cycle; and
  in a case that the fifth DRX group works in the short DRX cycle, in a case that a WUS time window before onDuration of each short DRX cycle is configured with the time domain location of the WUS, determining, according to a WUS received in the WUS time window before onDuration of each DRX cycle, whether to start an onDuration timer in each short DRX cycle.

The terminal device 800 can implement each process implemented by the terminal device in the foregoing embodiments. To avoid repetition, details are not described herein again.

In this embodiment of the present disclosure, when the terminal device 600 is configured with multiple DRX groups, the terminal device receives the WUS used to indicate whether to start onDuration timers in the next DRX cycles of all DRX groups. Therefore, the terminal device may determine, based on the WUS, whether to start the onDuration timer in the next DRX cycle of each DRX group. Embodiments of the present disclosure provide a simple WUS indicator solution when a terminal device is configured with multiple DRX groups.

It should be understood that in this embodiment of the present disclosure, the radio frequency unit 801 may be configured to receive and send information or receive, and send a signal in a call process. Specifically, after receiving downlink data from a base station, the radio frequency unit sends the downlink data to the processor 810 for processing. In addition, the radio frequency unit sends uplink data to the base station. Generally, the radio frequency unit 801 includes, but is not limited to, an antenna, at least one amplifier, a transceiver, a coupler, a low noise amplifier, and a duplexer. In addition, the radio frequency unit 801 may also communicate with another device by using a wireless communications system and network.

The terminal device provides wireless broadband Internet access for the user by using the network module 802, for example, helping the user to send and receive an e-mail, brows a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, call signal receiving sound or message receiving sound) related to a specific function performed by the terminal device 800. The audio output unit 803 includes a loudspeaker, a buzzer, a receiver, and the like.

The input unit 804 is configured to receive audio or video signals. The input unit 804 may include a Graphics Processing Unit (GPU) 8041 and a microphone 8042. The graphics processing unit 8041 processes image data of a static image or video obtained by an image capture apparatus (such as, a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. The processed audio data may be converted, in a telephone call mode, into a format that may be sent to a mobile communication base station by using the radio frequency unit 801, and the audio data obtained after conversion is output.

The terminal device 800 further includes at least one sensor 805, such as an optical sensor, a motion sensor, and other sensors. Specifically, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by the user or information provided for the user. The display unit 806 may include a display panel 8061. The display panel 8061 may be configured in a form of a Liquid Crystal Display (LCD), an Organic Light-Emitting Diode (OLED), or the like.

The user input unit 807 may be configured to receive input digit or character information, and generate a key signal input related to a user setting and function control of the terminal device. Specifically, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented by using various types such as a resistive type, a capacitive type, an infrared ray type or a surface acoustic wave type. In addition to the touch panel 8071, the user input unit 807 may further include another input device 8072. Specifically, the another input device 8072 may include but is not limited to: a physical keyboard, a function key (such as a volume control key, or a switch key), a trackball, a mouse, and a joystick. Details are not described herein.

Further, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, although the touch panel 8071 and the display panel 8061 are used as two independent parts to implement input and output functions of the terminal device, in some embodiments, the touch panel 8071 and the display panel 8061 may be integrated to implement the input and output functions of the terminal device. This is not specifically limited herein.

The interface unit 808 is an interface for connecting an external apparatus with the terminal device 800. For example, the external apparatus may include a wired or wireless headphone jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive input (for example, data information and power) from an external apparatus and transmit the received input to one or more elements in the terminal device 800 or may be configured to transmit data between the terminal device 800 and an external apparatus.

The memory 809 may be configured to store a software program and various data. The memory 809 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 809 may include a high-speed random access memory or a nonvolatile memory, for example, at least one disk storage device, a flash memory, or another volatile solid-state storage device.

The processor 810 is a control center of the terminal device, is connected to each part of the entire terminal device by using various interfaces and lines, and performs various functions of the terminal device and data processing by running or executing the software program and/or the module that are/is stored in the memory 809 and invoking data stored in the memory 809, to perform overall monitoring on the terminal device. The processor 810 may include one or more processing units. In some embodiments, the processor 810 may integrate an application processor and a modem processor. The application processor mainly deals with an operating system, a user interface, an application, and the like. The modem processor mainly deals with wireless communication. It may be understood that the modem processor may not be integrated into the processor 810.

The terminal device 800 may further include the power supply 811 (for example, a battery) configured to supply power to various components. Preferably, the power supply 811 may be logically connected to the processor 810 through a power management system, so as to implement functions such as managing charging, discharging, and power consumption through the power management system.

In addition, the terminal device 800 includes some function modules not shown. Details are not described herein.

Preferably, an embodiment of the present disclosure further provides a terminal device, including a processor 810, a memory 809, and a computer program stored in the memory 809 and executable on the processor 810. When the computer program is executed by the processor 810, processes of the foregoing embodiment of the WUS processing method, and a same technical effect can be achieved. To avoid repetition, details are not described herein again.

Figure 9:
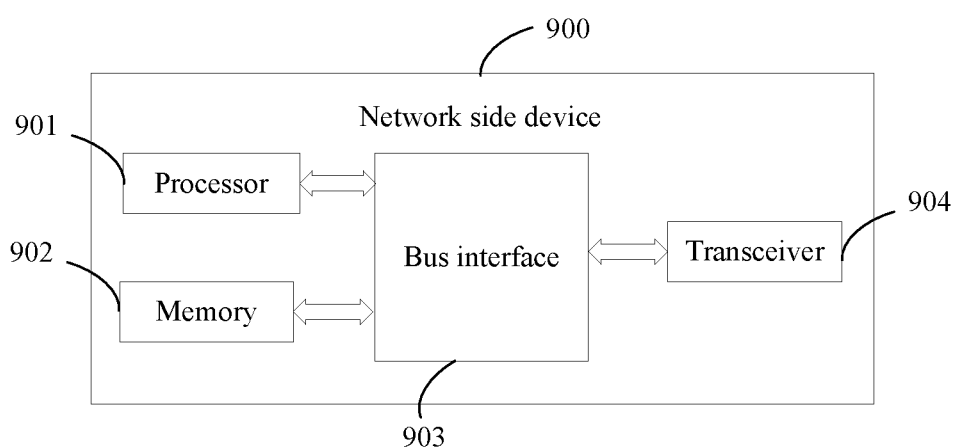
FIG. 9 is a structural diagram of a network side device according to another embodiment of the present disclosure.

FIG. 9 is a structural diagram of a network side device according to another embodiment of the present disclosure. As shown in FIG. 9, a network side device 900 includes: a processor 901, a memory 902, a bus interface 903, and a transceiver 904, where the processor 901, the memory 902, and the transceiver 904 are all connected to the bus interface 903.

In this embodiment of the present disclosure, the network side device 900 further includes a computer program stored in the memory 902 and executable on the processor 901. When the computer program is executed by the processor 901, the following step is implemented:

configuring a WUS for a terminal device when configuring at least two DRX groups for the terminal device; where the WUS is used to indicate whether to start onDuration timers in the next DRX cycles of all of the at least two DRX groups.

In some embodiments, when the computer program is executed by the processor 901, the following step may be further implemented:

sending a first indicator to the terminal device through the transceiver 904; where the first indicator is used to indicate, in a case that reception of the WUS fails, whether to start onDuration timers in the next DRX cycles of some or all of the at least two DRX groups.

In some embodiments, the first indicator includes one sub-indicator, and the sub-indicator corresponds to all of the at least two DRX groups; or the first indicator includes at least two sub-indicators, and the at least two sub-indicators respectively correspond to different DRX groups of the at least two DRX groups.

In this embodiment of the present disclosure, when the network side device 900 configures at least two DRX groups for the terminal device, the network side device 900 configures, for the terminal device, the WUS used to indicate whether to start onDuration timers in the next DRX cycles of all DRX groups. Therefore, the terminal device may determine, based on the WUS, whether to start the onDuration timer in the next DRX cycle of each DRX group. Embodiments of the present disclosure provide a simple WUS indicator solution when a terminal device is configured with multiple DRX groups.

An embodiment of the present disclosure further provides a computer readable storage medium. The computer readable storage medium stores a computer program. When the computer program is executed by a processor, the processes of the foregoing embodiments of the WUS processing method are implemented, and a same technical effect can be achieved. To avoid repetition, details are not described herein again. The computer-readable storage medium includes a Read-Only Memory (ROM), a Random Access Memory (RAM), a magnetic disk, an optical disc, or the like.

An embodiment of the present disclosure further provides another computer readable storage medium. The computer readable storage medium stores a computer program. When the computer program is executed by a processor, the processes of the foregoing embodiments of the WUS configuration method are implemented, and a same technical effect can be achieved. To avoid repetition, details are not described herein again. The computer readable storage medium includes a ROM, a RAM, a magnetic disk, an optical disc, or the like.

It should be noted that in this specification, the terms "include", "contain" and any other variants thereof are intended to cover non-exclusive inclusion, so that a process, a method, an article, or a device that includes a series of elements not only includes these elements, but may also include other elements not expressly listed, or also include elements inherent to this process, method, article, or device. Without more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software plus a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. A Wake Up Signal (WUS) processing method, executed by a terminal device, comprising:
when the terminal device is configured with at least two DRX groups, determining whether to receive a WUS according to statuses of some or all of at least two Discontinuous Reception (DRX) groups, wherein the WUS is configured in one of the at least two DRX groups,
in response to determining not to receive the WUS,
starting an onDuration timer in a next DRX cycle of each of the at least two DRX groups; or
starting an onDuration timer in the next DRX cycle of a first DRX group of the at least two DRX groups, wherein the first DRX group is a DRX group configured with the WUS in the at least two DRX groups, or the first DRX group is a DRX group whose active time overlaps with a time domain location of the WUS in the at least two DRX groups,
wherein the WUS is used to indicate whether to start onDuration timers in next DRX cycles of all of the at least two DRX groups.

2. The WUS processing method according to claim 1, comprising:
in response to determining to receive the WUS, receiving the WUS.

3. The WUS processing method according to claim 2, wherein after receiving the WUS, the WUS processing method further comprises:
determining, according to the WUS, whether to start onDuration timers in the next DRX cycles of all of the at least two DRX groups.

4. The WUS processing method according to claim 2, further comprising one of the following:
when a reception of the WUS fails, determining, according to a first indicator, whether to start the onDuration timers in the next DRX cycles of some or all of the at least two DRX groups, wherein the first indicator is predefined in a protocol or configured by a network side device;
when the reception of the WUS fails, starting the onDuration timers in the next DRX cycles of some or all of the at least two DRX groups; or
when the reception of the WUS fails, determining, according to a status of at least one of the at least two DRX groups, whether to start the onDuration timers in the next DRX cycles of some or all of the at least two DRX groups.

5. The WUS processing method according to claim 4, wherein the first indicator comprises one sub-indicator, and the sub-indicator corresponds to all of the at least two DRX groups; or the first indicator comprises at least two sub-indicators, and the at least two sub-indicators respectively correspond to different DRX groups of the at least two DRX groups.

6. The WUS processing method according to claim 4, wherein starting the onDuration timers in the next DRX cycles of some or all of the at least two DRX groups when the reception of the WUS fails comprises one of the following:
starting an onDuration timer in the next DRX cycle of each of the at least two DRX groups when the reception of the WUS fails; or
starting an onDuration timer in the next DRX cycle of a third DRX group when the reception of the WUS fails, wherein the third DRX group is a DRX group configured with the WUS in the at least two DRX groups.

7. The WUS processing method according to claim 4, wherein determining, according to the status of the at least one of the at least two DRX groups when the reception of the WUS fails, whether to start the onDuration timers in the next DRX cycles of some or all of the at least two DRX groups comprises:
when the reception of the WUS fails and the time domain location of the WUS is in active time of a fourth DRX group, starting an onDuration timer in the next DRX cycle of the fourth DRX group,
wherein the fourth DRX group is any one of the at least two DRX groups.

8. The WUS processing method according to claim 1, wherein determining whether to receive the WUS further comprises one of the following:
when the time domain location of the WUS is in active time of a second DRX group, determining not to receive the WUS; otherwise, determining to receive the WUS, wherein the second DRX group is a DRX group configured with the WUS in the at least two DRX groups;
when the time domain location of the WUS is in active time of all of the at least two DRX groups, determining not to receive the WUS; otherwise, determining to receive the WUS; or
when the time domain location of the WUS is in active time of any one of the at least two DRX groups, determining not to receive the WUS; otherwise, determining to receive the WUS.

9. The WUS processing method according to claim 1, wherein:
a fifth DRX group is configured with a parameter of a long DRX cycle and a parameter of a short DRX cycle, the long DRX cycle is an integer multiple of the short DRX cycle, and the fifth DRX group is any one of the at least two DRX groups; and
the WUS processing method further comprises one of the following:
when the fifth DRX group works in the short DRX cycle and only a WUS time window before onDuration of the long DRX cycle is configured with the time domain location of the WUS, determining, according to the WUS received in the WUS time window before the onDuration of the long DRX cycle, whether to start onDuration timers in all short DRX cycles within a range of the long DRX cycle; or
when the fifth DRX group works in the short DRX cycle, and a WUS time window before onDuration of each short DRX cycle is configured with the time domain location of the WUS, determining, according to a WUS received in the WUS time window before onDuration of each DRX cycle, whether to start an onDuration timer in each short DRX cycle.

10. A Wake Up Signal (WUS) configuration method, executed by a network side device, comprising:
configuring a WUS for a terminal device when configuring at least two Discontinuous Reception (DRX) groups for the terminal device,
wherein the WUS is used to indicate whether to start onDuration timers in next DRX cycles of all of the at least two DRX groups; and
sending a first indicator to the terminal device, wherein the first indicator is used to indicate, when reception of the WUS fails, whether to start onDuration timers in next DRX cycles of some or all of the at least two DRX groups.

11. The WUS configuration method according to claim 10, wherein the first indicator comprises one sub-indicator, and the sub-indicator corresponds to all of the at least two DRX groups; or
the first indicator comprises at least two sub-indicators, and the at least two sub-indicators respectively correspond to different DRX groups of the at least two DRX groups.

12. A terminal device, comprising: a processor, a memory, and a computer program stored in the memory and executable on the processor, wherein the computer program, when executed by the processor, causes the processor to implement operations comprising:
when the terminal device is configured with at least two DRX groups, determining whether to receive a WUS according to statuses of some or all of at least two Discontinuous Reception (DRX) groups, wherein the WUS is configured in one of the at least two DRX groups,
in response to determining not to receive the WUS,
starting an onDuration timer in a next DRX cycle of each of the at least two DRX groups;
or
starting an onDuration timer in the next DRX cycle of a first DRX group of the at least two DRX groups, wherein the first DRX group is a DRX group configured with the WUS in the at least two DRX groups, or the first DRX group is a DRX group whose active time overlaps with a time domain location of the WUS in the at least two DRX groups, wherein the WUS is used to indicate whether to start onDuration timers in next DRX cycles of all of the at least two DRX groups.

13. The terminal device according to claim 12, wherein the operations further comprise:
in response to determining to receive the WUS, receiving the WUS.

14. The terminal device according to claim 13, wherein the operations further comprise one of the following:
when the time domain location of the WUS is in active time of a second DRX group, determining not to receive the WUS; otherwise, determining to receive the WUS, wherein the second DRX group is a DRX group configured with the WUS in the at least two DRX groups;
when the time domain location of the WUS is in active time of all of the at least two DRX groups, determining not to receive the WUS; otherwise, determining to receive the WUS; or
when the time domain location of the WUS is in active time of any one of the at least two DRX groups, determining not to receive the WUS; otherwise, determining to receive the WUS.

15. The terminal device according to claim 13, wherein after receiving the WUS, the operations comprise:
determining, according to the WUS, whether to start onDuration timers in the next DRX cycles of all of the at least two DRX groups.

16. The terminal device according to claim 13, wherein the operations further comprise one of the following:
when a reception of the WUS fails, determining, according to a first indicator, whether to start the onDuration timers in the next DRX cycles of some or all of the at least two DRX groups, wherein the first indicator is predefined in a protocol or configured by a network side device;
when the reception of the WUS fails, starting the onDuration timers in the next DRX cycles of some or all of the at least two DRX groups; or
when the reception of the WUS fails, determining, according to a status of at least one of the at least two DRX groups, whether to start the onDuration timers in the next DRX cycles of some or all of the at least two DRX groups.

17. The terminal device according to claim 16, wherein the first indicator comprises one sub-indicator, and the sub-indicator corresponds to all of the at least two DRX groups; or the first indicator comprises at least two sub-indicators, and the at least two sub-indicators respectively correspond to different DRX groups of the at least two DRX groups.

* * * * *